US009976935B2

(12) United States Patent
Belwafa et al.

(10) Patent No.: US 9,976,935 B2
(45) Date of Patent: May 22, 2018

(54) METHOD AND SYSTEM FOR EVALUATING STRUCTURAL VEHICLE COMPONENT PERFORMANCE

(71) Applicant: Ford Global Technologies, LLC, Dearborn, MI (US)

(72) Inventors: Jamel E. Belwafa, Ann Arbor, MI (US); Michael Barnhart, Saline, MI (US); Mohamed Ridha Baccouche, Ann Arbor, MI (US); Rahul Arora, Royal Oak, MI (US); Stephen Philip Panoff, Canton, MI (US); Saied Nusier, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 15/175,546

(22) Filed: Jun. 7, 2016

(65) Prior Publication Data

US 2017/0350791 A1    Dec. 7, 2017

(51) Int. Cl.
  *G01M 7/00*      (2006.01)
  *G01M 17/007*    (2006.01)

(52) U.S. Cl.
  CPC .............................. *G01M 17/0078* (2013.01)

(58) Field of Classification Search
  CPC .. G01N 3/42; G01N 3/30; G01N 3/40; G01M 7/08; G01M 17/0078
  USPC .............................. 73/12.09, 82, 844, 118.01
  See application file for complete search history.

(56) References Cited

U.S. PATENT DOCUMENTS

| 5,483,845 | A | * | 1/1996 | Stein | ................. | G01M 17/0078 73/12.01 |
| 5,485,758 | A | * | 1/1996 | Brown | .............. | G01M 17/0078 73/12.04 |
| 5,929,348 | A | * | 7/1999 | Stein | ....................... | G01M 7/08 73/12.07 |
| 6,997,036 | B2 | * | 2/2006 | Kojima | ............. | G01M 17/0078 73/12.09 |
| 7,158,016 | B2 | * | 1/2007 | Cuddihy | .............. | G08B 25/016 340/436 |
| 8,776,575 | B2 |   | 7/2014 | Young et al. | | |
| 8,943,871 | B2 | * | 2/2015 | Wittmann | ......... | G01M 17/0078 607/150 |

(Continued)

FOREIGN PATENT DOCUMENTS

DE    4407256 A1    9/1994
ES    2303804 A1    8/2008

*Primary Examiner* — Eric S McCall
*Assistant Examiner* — Mohammed E Keramet-Amircola
(74) *Attorney, Agent, or Firm* — Jason C. Rogers; Brooks Kushman, P.C.

(57) ABSTRACT

An assembly to simulate side impacts to a vehicle includes a rocker, a translatable sled, and one or more displacement members. The rocker is secured to a wall. A b-pillar extends from the rocker and a roof rail is secured to the b-pillar and the wall. The translatable sled is arranged with the wall to impact the b-pillar. The one or more displacement members are secured to the wall and spaced from the rocker to simulate a stiffness of a full vehicle frame during impact between the sled and the b-pillar. A first rocker end constraint may secure a first end of the rocker to the wall. A second rocker end constraint may secure a second end of the rocker to the wall. The constraints may be arranged with the rocker such that the ends of the rocker may pivot relative to the wall.

20 Claims, 8 Drawing Sheets

(56) References Cited

U.S. PATENT DOCUMENTS

| | | | |
|---|---|---|---|
| 9,086,332 B2 | 7/2015 | Ito et al. | |
| 9,630,578 B1 * | 4/2017 | Nusier | B60R 19/12 |
| 9,630,651 B1 * | 4/2017 | Baccouche | B62D 25/04 |
| 9,709,410 B2 * | 7/2017 | MacNeille | G01C 21/3415 |
| 9,816,898 B2 * | 11/2017 | Belwafa | G01M 17/0078 |
| 2008/0016970 A1 * | 1/2008 | Klein | G01M 17/0078 73/865.3 |
| 2010/0170330 A1 * | 7/2010 | Scheepers | G01M 17/0072 73/116.01 |
| 2011/0241385 A1 * | 10/2011 | Baccouche | B62D 21/152 296/203.02 |
| 2012/0136640 A1 * | 5/2012 | Ito | G01M 17/0078 703/8 |
| 2012/0204630 A1 * | 8/2012 | Wallich | G01M 17/0078 73/118.01 |
| 2013/0069395 A1 * | 3/2013 | Nusier | B62D 25/06 296/203.03 |
| 2013/0118226 A1 * | 5/2013 | Young | G01N 3/30 73/12.01 |
| 2013/0283902 A1 * | 10/2013 | Kobayashi | G01M 17/0078 73/118.01 |
| 2015/0021936 A1 * | 1/2015 | Nusier | B62D 21/152 293/114 |
| 2016/0223433 A1 * | 8/2016 | Belwafa | G01M 17/007 |
| 2016/0280274 A1 * | 9/2016 | Nusier | B62D 21/03 |

* cited by examiner

METHOD AND SYSTEM FOR EVALUATING STRUCTURAL VEHICLE COMPONENT PERFORMANCE

TECHNICAL FIELD

This disclosure relates to a method and a system to evaluate vehicle component performance when subject to impact conditions.

BACKGROUND

Components of automotive vehicles are tested for performance under impacts, such as side impacts. Test apparatuses are often used with full vehicles to evaluate performance of the vehicle components. For example, side impact crash tests may include a stationary test vehicle struck on a driver side by a crash cart. The crash cart may impact the driver side at a ninety degree angle. Data may be recorded during and after the side impact crash test to identify a performance of the vehicle components. Requiring a full vehicle to execute the side impact crash test may be costly and time consuming.

SUMMARY

An assembly to simulate side impacts to a vehicle includes a rocker, a translatable sled, and one or more displacement members. The rocker is secured to a wall. A b-pillar extends from the rocker and a roof rail is secured to the b-pillar and the wall. The translatable sled is arranged with the wall to impact the b-pillar. The one or more displacement members are secured to the wall and spaced from the rocker to simulate a stiffness of a full vehicle frame during impact between the sled and the b-pillar. A first rocker end constraint may secure a first end of the rocker to the wall. A second rocker end constraint may secure a second end of the rocker to the wall. The constraints may be arranged with the rocker such that the ends of the rocker may pivot relative to the wall. Each of the first rocker end constraint and the second rocker end constraint may further include a base portion secured to the wall, a horizontal member mounted for pivotal movement to the base portion about an axis defined by a rocker pin, and a rocker slot defined by the horizontal member and arranged with the rocker pin to constrain linear movement of the horizontal member. A first roof rail end constraint may secure a first end of the roof rail to the wall. A second roof rail end constraint may secure a second end of the roof rail to the wall. The constraints may be arranged with the roof rail such that the ends of the roof rail may move up and down relative to an underlying surface. Each of the first roof rail end constraint and the second roof rail end constraint may include a base portion secured to the wall, a horizontal member including a shaft sized to extend through a roof rail slot defined by the base portion, and a roof rail pin extending from the shaft and sized to constrain movement of the shaft within the roof rail slot. One or more stoppers may extend from the wall to constrain a distance of sled travel relative to the wall. The one or more displacement members may include rocker displacement members extending from the wall and spaced from the rocker at a distance of zero to fifty millimeters. The one or more displacement members may include roof rail displacement members extending from the wall and spaced from the roof rail at a distance of zero to thirty millimeters. The sled may include a protrusion including an impact region oriented at approximately two hundred and fifty millimeters from a body of the sled.

A test apparatus to evaluate b-pillar impacts of a vehicle includes a b-pillar region support structure, first and second rocker end constraints, first and second roof rail end constraints, a set of rails, and one or more rocker displacement members. The first rocker end constraint is secured to the support structure to support a first end of a rocker. The second rocker end constraint is secured to the support structure to support a second end of the rocker. The first roof rail end constraint is secured to the support structure to support a first end of a roof rail. The second roof rail end constraint is secured to the support structure to support a second end of the roof rail. The end constraints are arranged with one another for a b-pillar member to extend from the rocker to the roof rail. The set of rails facilitate translation of a sled thereupon and are aligned with the b-pillar region support structure for delivery of the sled to the b-pillar region. The one or more rocker displacement members are secured to the support structure and spaced from the rocker to simulate a stiffness of a full vehicle frame under impact between the sled and the b-pillar member. Each of the first rocker end constraint and the second rocker end constraint may include a pin and slot combination arranged with the rocker to facilitate pivotal movement about an axis defined by the pin and constrained by a size of the slot. Each of the first roof rail end constraint and the second roof rail end constraint may include a pin and slot combination arranged with the roof rail to facilitate up and down movement of the roof rail constrained by a size of the slot. The one or more rocker displacement members are spaced from the rocker at a predetermined distance and sized with a predetermined cross-sectional profile. The predetermined distance, the predetermined cross-sectional profile, and the rocker are selected to include stiffness characteristics of a full vehicle frame during impact of the sled and b-pillar member. One or more roof rail displacement members may extend from a wall of the support structure and may be arranged with the roof rail to simulate stiffness characteristics of a full vehicle frame during impact of the sled and the b-pillar member. The one or more rocker displacement members may be spaced from the rocker a distance between zero and fifty millimeters. One or more stoppers may extend from the wall of the support structure and may be arranged with the rails such that the sled stops traveling toward the wall at a predetermined distance from the wall. One or more stoppers may extend from the wall of the support structure and may be arranged with the sled such that an attachment of the sled impacts the b-pillar member and does not travel past a predetermined distance threshold relative to the wall.

A method to simulate a side impact to a full vehicle includes positioning rocker end constraints on a wall to support opposite ends of a rocker; positioning roof rail end constraints on the wall to support opposite ends of a roof rail; securing a b-pillar member to the rocker and roof rail; and positioning displacement members on the wall proximate the rocker and roof rail to reinforce a stiffness of the rocker and roof rail during impact of a sled to simulate an impact of the sled to a full vehicle frame. The method may also include positioning the roof rail end constraints such that a gap between the roof rail and displacement members is between zero and thirty millimeters. The method may also include positioning the rocker end constraints such that a gap between the rocker and displacement members is between zero and fifty millimeters.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Current test procedures and test apparatuses for side impacts to vehicles may use a full vehicle to test a portion of the vehicle, such as a b-pillar region. Using the full vehicle in these side impact tests may require building the full vehicle and components though the impact test focuses on only a particular region or component.

Figure 1:
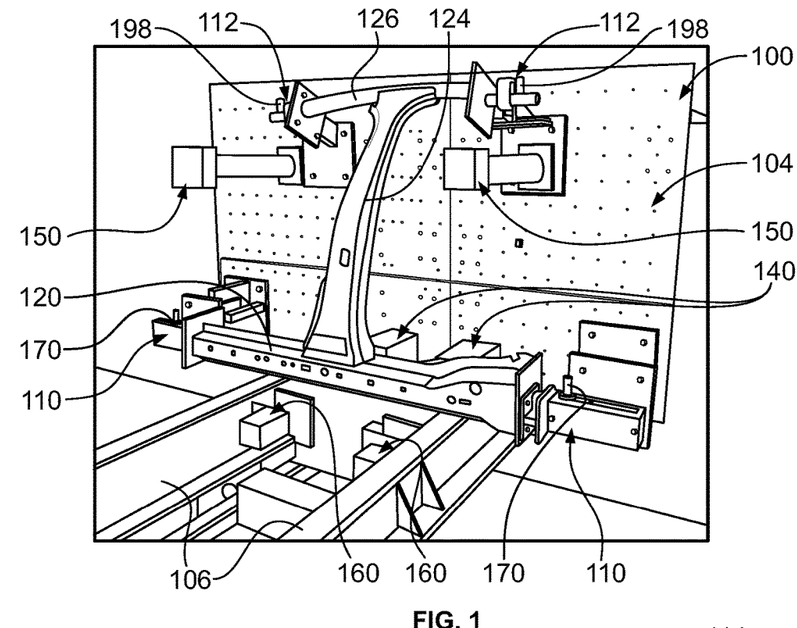
FIG. 1 is a perspective view of an example of a portion of a test apparatus and a portion of a vehicle frame.
Figure 2:
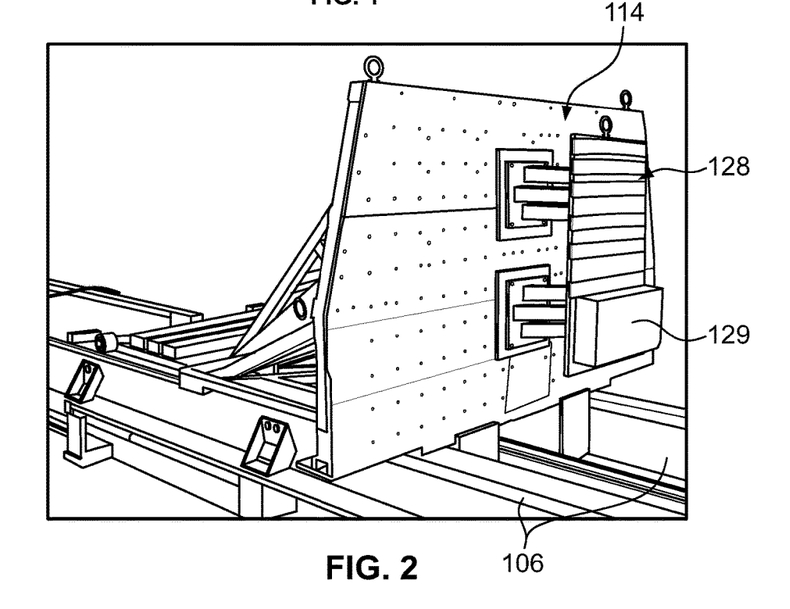
FIG. 2 is a perspective view of an example of a sled of the test apparatus of FIG. 1.
Figure 3:
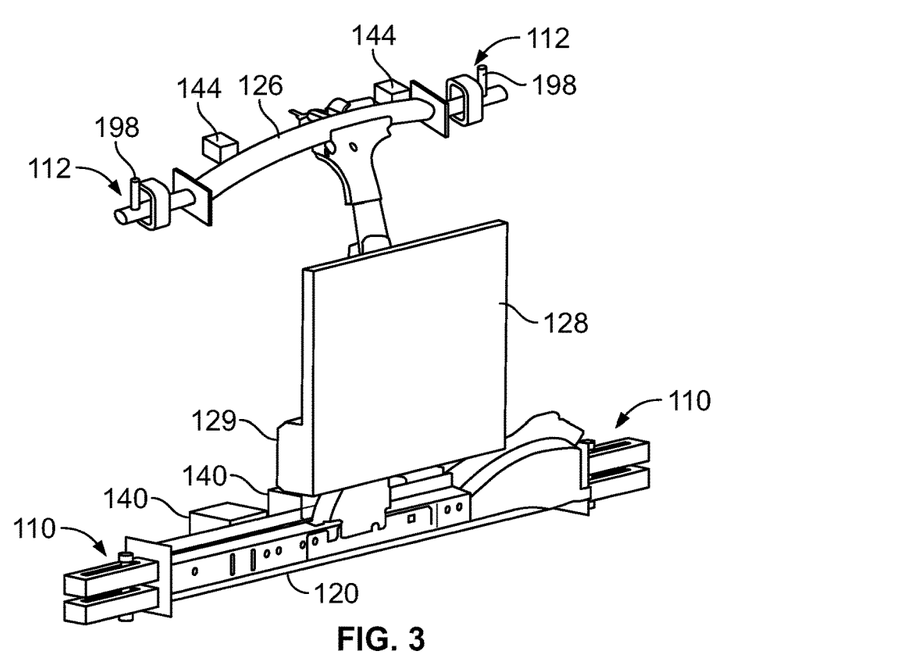
FIG. 3 is a front perspective view of the portion of the test apparatus and the portion of the vehicle frame of FIG. 1.
Figure 4:
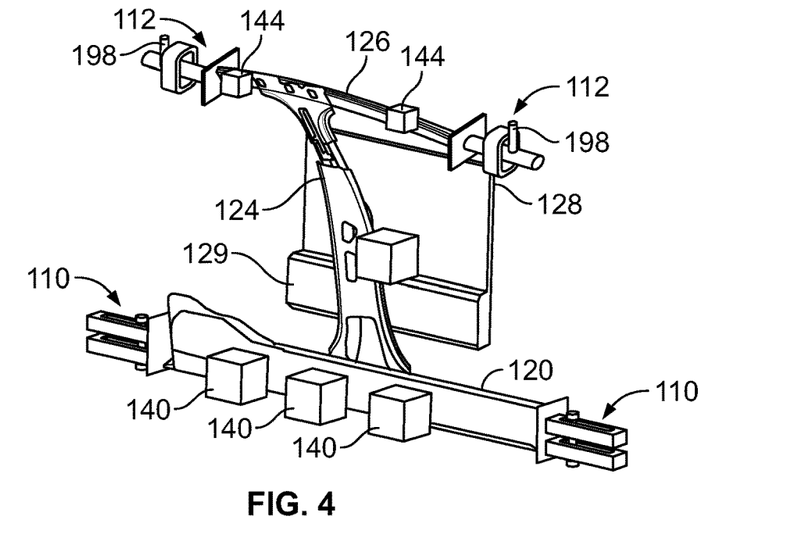
FIG. 4 is a rear perspective view of the portion of the test apparatus and the portion of the vehicle frame of FIG. 1.
Figure 5:
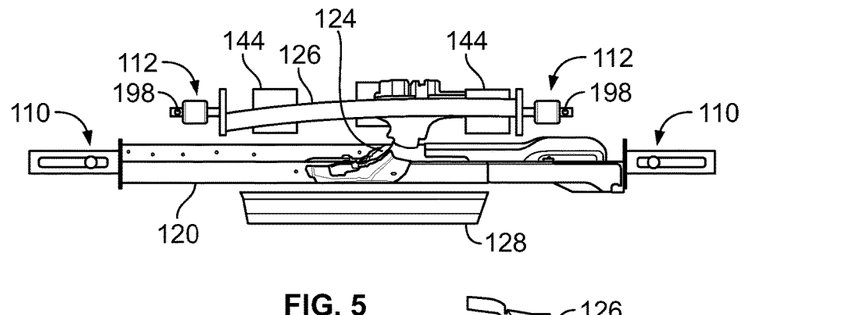
FIG. 5 is a top view of the portion of the test apparatus and the portion of the vehicle frame of FIG. 1.
Figure 6:
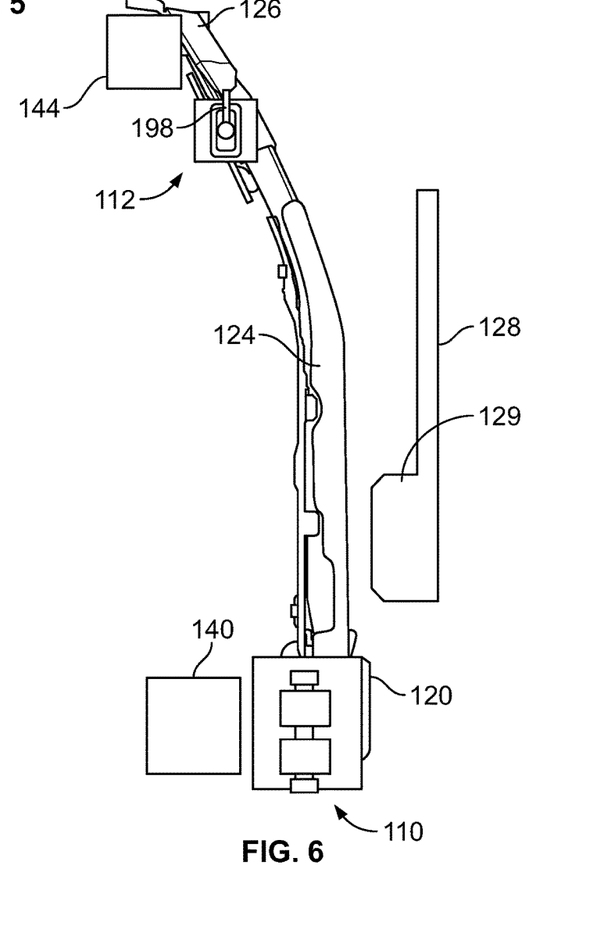
FIG. 6 is a side view of the portion of the test apparatus and the portion of the vehicle frame of FIG. 1.
Figure 7:
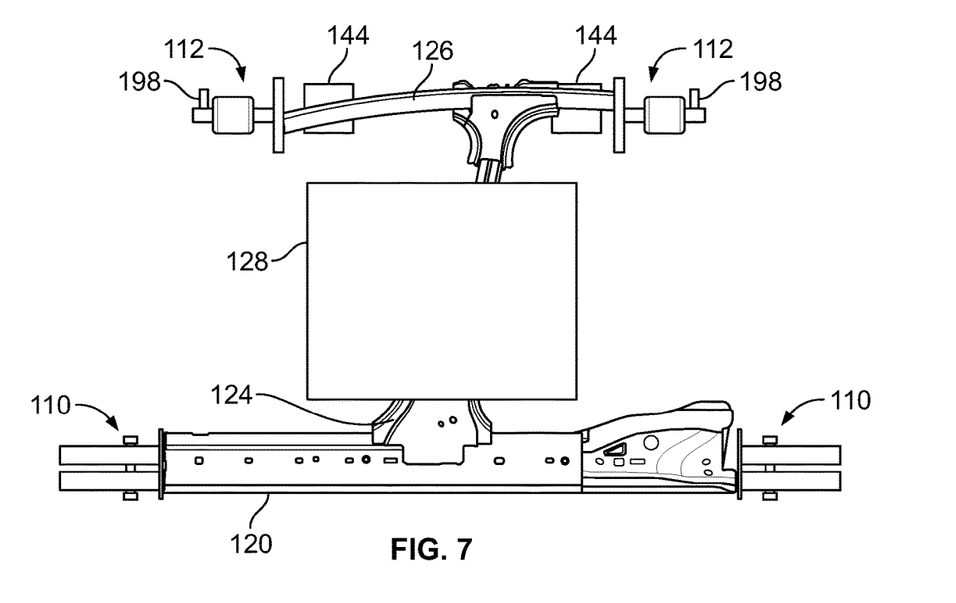
FIG. 7 is a front view of the portion of the test apparatus and the portion of the vehicle frame of FIG. 1.

FIGS. 1 and 2 show an example of a test apparatus, referred to generally as a test apparatus 100, to support a portion of a vehicle frame for side impact performance testing. The test apparatus 100 may include a support structure to support a portion of a b-pillar region of a vehicle frame. The support structure may include a wall 104, a set of rails 106, a set of rocker end constraints 110, a set of roof rail end constraints 112, and a sled 114 (shown in FIG. 2). The portion of the b-pillar region of a vehicle frame may include a rocker 120, a b-pillar member 124, and a roof rail 126. The wall 104 and the set of rails 106 may be supported by an underlying surface. The sled 114 may be mounted to the set of rails 106 for translation. For example, the wall 104 and the set of rails 106 may be arranged with one another such that translation of the sled 114 may cause an impact of the sled 114 and to the b-pillar member 124. The sled 114 may include an attachment 128. The attachment 128 may be removable to facilitate a use of multiple shapes and sizes of the attachment 128. For example, the attachment 128 may operate as a protrusion and include an impact region 129. The impact region 129 may have various shapes or forms depending on a desired test. For example, the impact region 129 may be sized and/or shaped to simulate different types of objects which may impact the b-pillar member 124. The impact region 129 may be spaced from the sled at a distance that will yield a targeted b-pillar deformation profile. In one example, the distance may be substantially equal to 250 mm.

The set of rocker end constraints 110 may be arranged with the rocker 120 to orient the rocker 120 above the set of rails 106 relative to the underlying surface. For example, one of the rocker end constraints 110 may support one end of the rocker 120 and the other of the rocker end constraints 110 may support the other end of the rocker 120. The b-pillar member 124 may be secured to the rocker 120 at a lower end and to the roof rail 126 at an upper end. One of the roof rail end constraints 112 may support one end of the roof rail 126 and the other of the roof rail end constraints 112 may support the other end of the roof rail 126. The constraints may be arranged relative to the wall to orient the rocker 120, the b-pillar member 124, and the roof rail 126 in a test position to receive an impact from the sled 114.

Referring additionally to FIGS. 3 through 7, one or more displacement members may be positioned at different locations of the test apparatus 100 to simulate various lateral displacement inputs that would be received if the b-pillar region was a part of a full vehicle. For example, three rocker displacement members 140 may be secured to the wall 104 and disposed between the rocker 120 and the wall 104. While three rocker displacement members 140 are used in this example, it is contemplated that a number of rocker displacement members 140 may be greater or less than three. The rocker displacement members 140 may slow down and restrict a lateral displacement of the rocker 120 upon the b-pillar member 124 or the rocker 120 receiving an impact from the sled 114. The rocker displacement members 140 may be spaced from the rocker 120 at a distance to support targeted b-pillar deformation, such as 30 mm. A composition of the rocker displacement members 140 may also assist in providing a predetermined amount of resistance during the impact test. An example of a composition for the rocker displacement members 140 may include aluminum honeycomb sized at 150 mm×150 mm.

As another example of displacement members, two roof rail displacement members 144 may be secured to the wall 104 and disposed between the roof rail 126 and the wall 104. While two roof rail displacement members 144 are used in this example, it is contemplated that a number of roof rail displacement members 144 may be greater or less than two. The roof rail displacement members 144 may slow down and restrict a lateral displacement of the roof rail 126 upon the b-pillar member 124 receiving an impact from the sled 114. The roof rail displacement members 144 may be spaced from the roof rail 126 at a distance sufficient to support targeted b-pillar deformation, such as 10 mm. A composition of the roof rail displacement members 144 may also assist in providing a predetermined amount of resistance during the impact test. An example of a composition for the roof rail displacement members 144 may include aluminum honeycomb sized at 100 mm×100 mm.

The rocker displacement members 140 and the roof rail displacement members 144 may assist in providing a stiffness environment similar to that which the rocker 120, the b-pillar member 124, and the roof rail 126 may experience if part of a full vehicle frame. The full vehicle frame may include, for example, vehicle cross members, floor components, and roof components which provide additional rigidity and stiffness to the b-pillar region. The rocker displacement members 140 and the roof rail displacement members 144 may thus assist in simulating conditions of a full vehicle frame for an impact test without having the associated additional components. This may assist in reducing an amount of time associated with preparing and conducting the impact test and reducing costs associated with the impact test.

The test apparatus 100 may also include stoppers to assist in constraining movement of the sled 114 relative to the wall 104. For example, a first set of stoppers 150 may extend from the wall 104 and be located between the roof rail 126 and the rocker 120. Each of the first set of stoppers 150 may extend a first predetermined distance from the wall 104. For example, the first set of stoppers 150 may extend past the b-pillar member 124 at the first predetermined distance to assist in constraining lateral movement of the sled 114 relative to the wall 104. A second set of stoppers 160 may extend from the wall 104 and be located below the rocker 120 and between the rails 106. Each of the second set of stoppers 160 may extend a second predetermined distance from the wall 104. For example, the second set of stoppers 160 may extend past the rocker 120 at the second predetermined distance to assist in constraining lateral movement of the sled 114 relative to the wall 104.

Figure 8A:
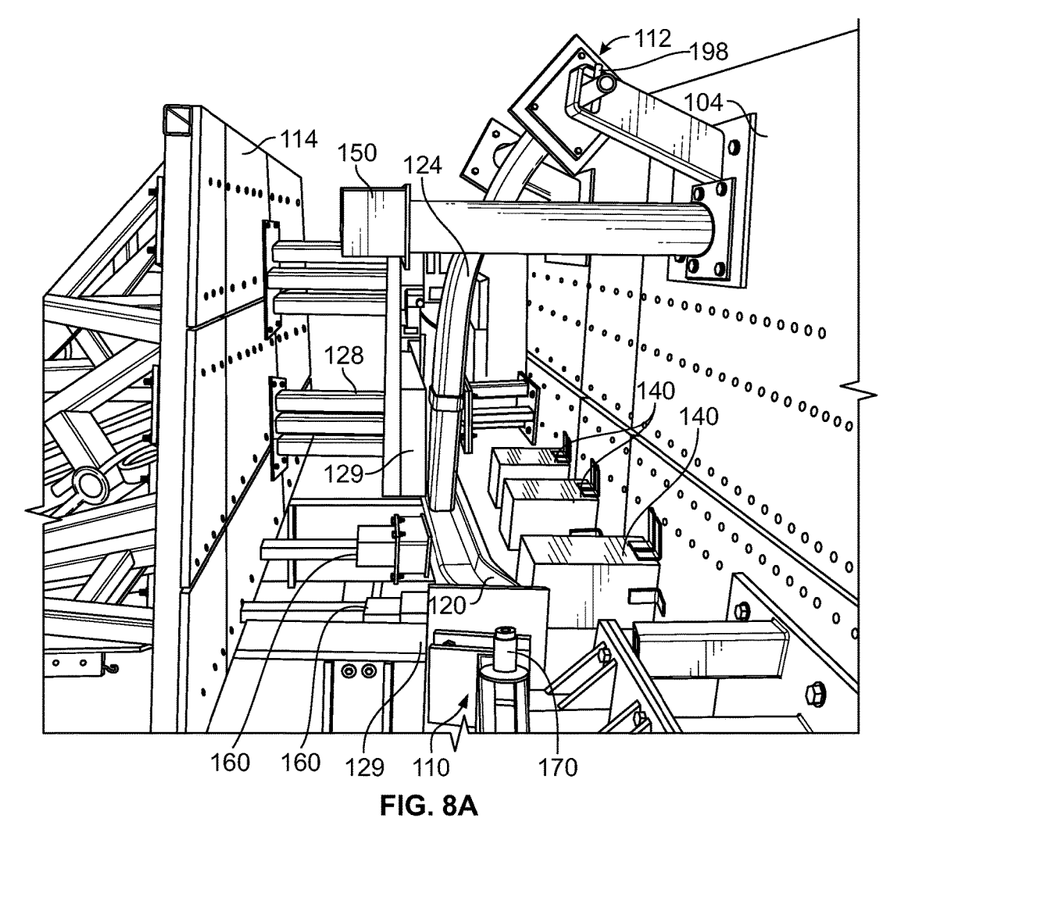
FIGS. 8A-8C are side views showing examples of three stages of an impact test including the test apparatus and portions of the vehicle frame of FIG. 1.
Figure 8B:
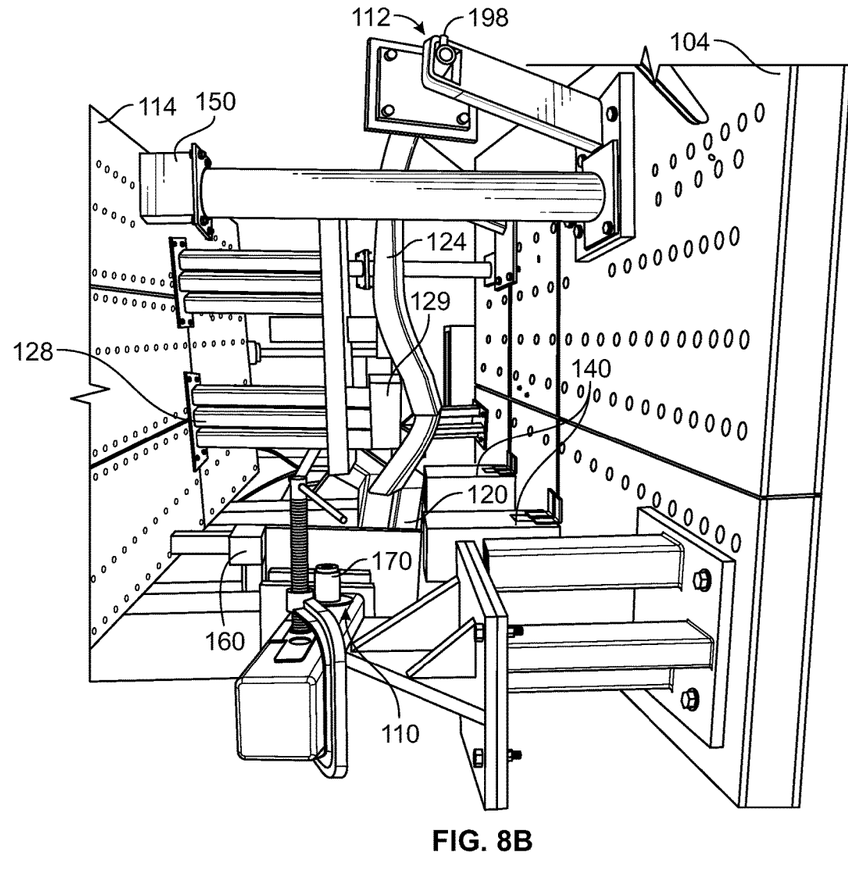

Three stages of an impact test are shown in FIGS. 8A through 8C. FIG. 8A shows the sled 114 and the attachment 128 at an initial contact stage in which the impact region 129 first contacts the b-pillar member 124. In this stage, the first set of stoppers 150 and the second set of stoppers 160 are not in contact with the sled 114. FIG. 8B shows the sled 114 and the attachment 128 at a full extension stage in which the impact region 129 of the attachment 128 is at maximum extension and at its closest position to the wall 104 during the impact test. The maximum extension of the attachment 128 is influenced by the first set of stoppers 150 and the second set of stoppers 160. As such, the first set of stoppers 150 and the second set of stoppers 160 may extend from the wall 104 to assist in constraining translation of the sled 114.

Figure 8C:
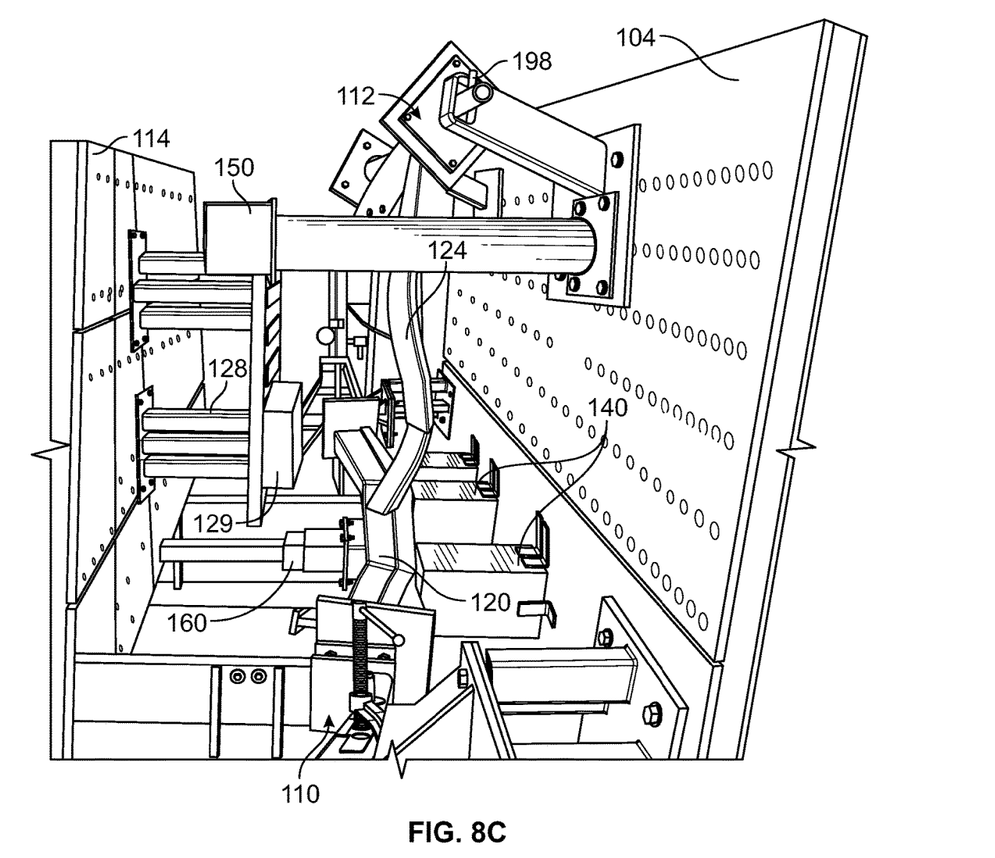

FIG. 8B also shows movement of the rocker end constraints 110 and the roof rail end constraints 112. For example the rocker end constraints 110 are shown offset and pivoted about a rocker pin 170 in comparison to an orientation shown in FIG. 8A and as further discussed below. As another example, the roof rail end constraints 112 are shown offset and moved in comparison to an orientation shown in FIG. 8A and as further described below. FIG. 8C shows the sled 114 retracted away from the wall 104 following impact as shown in FIG. 8B. FIG. 8C further shows deformation to the rocker 120 and the b-pillar member 124 following impact and the rocker displacement members 140 contacting the rocker 120. As described above, the orientation of the rocker displacement members 140 assists in simulating a stiffness of a full vehicle environment for the rocker 120 and surrounding components.

Figure 9:
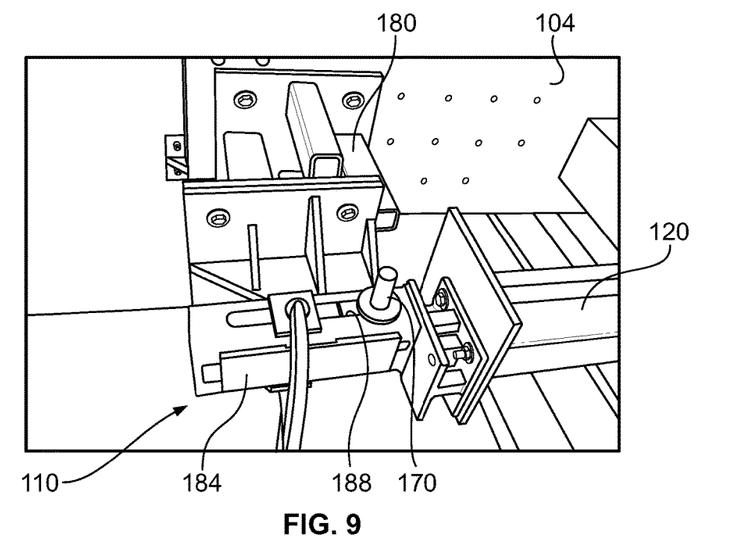
FIG. 9 is a perspective view of an example of a rocker end constraint of the test apparatus of FIG. 1.

FIG. 9 shows one of the rocker end constraints 110. Each of the rocker end constraints 110 may be secured to the wall 104 via a base portion 180. A horizontal member 184 may support one end of the rocker 120. The horizontal member 184 may be mounted to the base portion 180 for pivotal movement. For example, the horizontal member 184 may be mounted to the base portion 180 via the rocker pin 170 and such that horizontal member 184 may pivot about an axis defined by the rocker pin 170. The horizontal member 184 may define a rocker slot 188 to constrain pivotal movement of the horizontal member 184. For example, pivotal movement of the horizontal member 184 may be constrained by a relationship between the rocker pin 170 and a spacer within the rocker slot 188.

Figure 10:
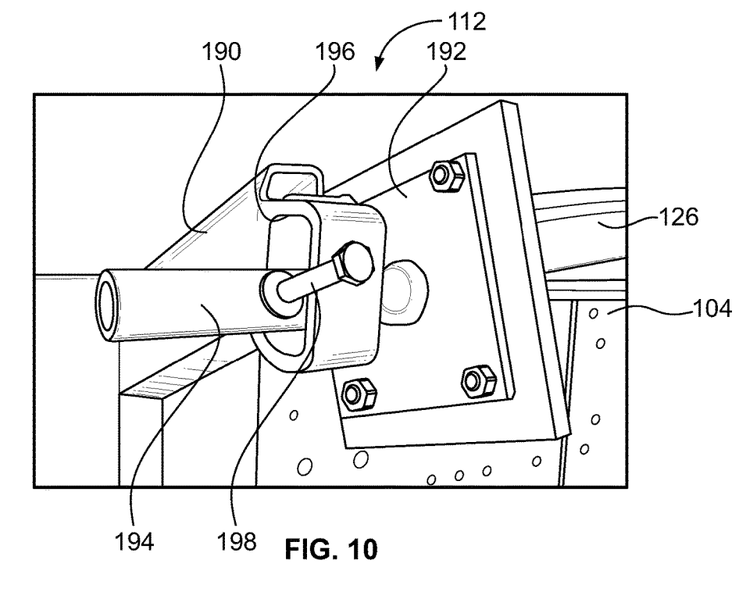
FIG. 10 is a perspective view of an example of a roof rail end constraint of the test apparatus of FIG. 1.

FIG. 10 shows one of the roof rail end constraints 112. Each of the roof rail end constraints 112 may be secured to the wall 104 via a base portion 190. A plate 192 may support one end of the roof rail 126. A shaft 194 may extend from the plate 192 and be sized to extend through a roof rail slot 196 defined by the base portion 190. The roof rail slot 196 may be sized such that the shaft 194 may translate therein. A roof rail pin 198 may extend from the shaft 194 and constrain movement of the shaft 194. For example, the roof rail pin 198 and the roof rail slot 196 may be arranged with one another such that the roof rail 126 may move up and down relative to the underlying surface. This up and down movement may assist in simulating forces incurred by the roof rail 126 during an impact to the b-pillar member 124.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle side impact simulation assembly comprising:
    a rocker secured to a continuous wall, a b-pillar extending from the rocker, and a roof rail secured to the b-pillar and the continuous wall;
    a translatable sled to impact the b-pillar; and
    one or more rocker displacement members secured to the continuous wall to contact the rocker to simulate a full vehicle stiffness when the rocker receives an impact force from the sled.

2. The assembly of claim 1 further comprising:
    a first rocker end constraint to secure a first end of the rocker to the continuous wall; and
    a second rocker end constraint to secure a second end of the rocker to the continuous wall, wherein the constraints are arranged with the rocker such that the ends of the rocker may pivot relative to the continuous wall.

3. The assembly of claim 2, wherein each of the first rocker end constraint and the second rocker end constraint further comprises a base portion secured to the continuous wall, a horizontal member mounted for pivotal movement to the base portion about an axis defined by a rocker pin, and a rocker slot defined by the horizontal member and arranged with the rocker pin to constrain linear movement of the horizontal member.

4. The assembly of claim 1 further comprising:
a first roof rail end constraint to secure a first end of the roof rail to the continuous wall; and
a second roof rail end constraint to secure a second end of the roof rail to the continuous wall, wherein the constraints are arranged with the roof rail such that the ends of the roof rail may move up and down relative to an underlying surface.

5. The assembly of claim 4, wherein each of the first roof rail end constraint and the second roof rail end constraint further comprises a base portion secured to the continuous wall, a horizontal member including a shaft sized to extend through a roof rail slot defined by the base portion, and a roof rail pin extending from the shaft and sized to constrain movement of the shaft within the roof rail slot.

6. The assembly of claim 1 further comprising one or more stoppers extending from the continuous wall to constrain a distance of sled travel relative to the wall.

7. The assembly of claim 1, wherein each of the one or more rocker displacement members extends from the continuous wall a length of zero to fifty millimeters.

8. The assembly of claim 1 further comprising one or more roof rail displacement members extending from the continuous wall and spaced from the roof rail at a length of zero to thirty millimeters.

9. The assembly of claim 1, wherein the sled further comprises a protrusion including an impact region oriented at approximately two hundred and fifty millimeters from a body of the sled.

10. A test apparatus to evaluate b-pillar impacts of a vehicle comprising:
a b-pillar region support structure;
a first rocker end constraint secured to the support structure to support a first end of a rocker;
a second rocker end constraint secured to the support structure to support a second end of the rocker;
a first roof rail end constraint secured to the support structure to support a first end of a roof rail;
a second roof rail end constraint secured to the support structure to support a second end of the roof rail, the end constraints arranged with one another for a b-pillar member to extend from the rocker to the roof rail;
a set of rails for translation of a sled thereupon and aligned with the b-pillar region support structure for delivery of the sled to the b-pillar region; and
one or more rocker displacement members secured to the support structure and spaced from the rocker to contact the rocker,
wherein the end constraints and the displacement members are arranged with the b-pillar member to simulate a full vehicle stiffness when the rocker receives an impact force from the sled.

11. The test apparatus of claim 10, wherein each of the first rocker end constraint and the second rocker end constraint includes a pin and slot combination arranged with the rocker to facilitate pivotal movement about an axis defined by the pin and constrained by a size of the slot.

12. The test apparatus of claim 10, wherein each of the first roof rail end constraint and the second roof rail end constraint includes a pin and slot combination arranged with the roof rail to facilitate up and down movement of the roof rail constrained by a size of the slot.

13. The test apparatus of claim 10, wherein the one or more rocker displacement members are spaced from the rocker at a predetermined length and sized with a predetermined cross-sectional profile, and wherein the predetermined length, the predetermined cross-sectional profile, and the rocker are selected to include stiffness characteristics of a full vehicle frame during impact of the sled and b-pillar member.

14. The test apparatus of claim 10 further comprising one or more roof rail displacement members extending from a continuous wall of the support structure and arranged with the roof rail to simulate stiffness characteristics of a full vehicle frame during impact of the sled and the b-pillar member.

15. The test apparatus of claim 10, wherein the one or more rocker displacement members are spaced from the rocker a length between zero and fifty millimeters.

16. The test apparatus of claim 10 further comprising one or more stoppers extending from a continuous wall of the support structure and arranged with the rails such that the sled stops traveling toward the continuous wall at a predetermined distance from the continuous wall.

17. The test apparatus of claim 10 further comprising one or more stoppers extending from a continuous wall of the support structure and arranged with the sled such that an attachment of the sled impacts the b-pillar member and does not travel past a predetermined distance threshold relative to the continuous wall.

18. A method to simulate a side impact to a full vehicle comprising:
positioning rocker end constraints on a continuous wall to support opposite ends of a rocker;
positioning roof rail end constraints on the continuous wall to support opposite ends of a roof rail;
securing a b-pillar member to the rocker and roof rail; and
positioning displacement members on the continuous wall each spaced from the rocker and roof rail to simulate a full vehicle stiffness when the rocker and roof rail receive an impact force a sled.

19. The method of claim 18 further comprising positioning the roof rail end constraints such that a gap between the roof rail and displacement members is between zero and thirty millimeters.

20. The method of claim 18 further comprising positioning the rocker end constraints such that a gap between the rocker and displacement members is between zero and fifty millimeters.

* * * * *